United States Patent
Hirokawa et al.

(10) Patent No.: US 9,481,442 B2
(45) Date of Patent: Nov. 1, 2016

(54) DRY PREFORM, ANNULAR STRUCTURE MADE OF A COMPOSITE MATERIAL, AND MANUFACTURING METHOD FOR THE ANNULAR STRUCTURE

(75) Inventors: Tetsuro Hirokawa, Osaka (JP); Shigeru Nishiyama, Toyoake (JP)

(73) Assignee: SHIKIBO LTD., Osaka (JP)

( * ) Notice: Subject to any disclaimer, the term of this patent is extended or adjusted under 35 U.S.C. 154(b) by 1084 days.

(21) Appl. No.: 13/425,559

(22) Filed: Mar. 21, 2012

(65) Prior Publication Data
US 2012/0244302 A1    Sep. 27, 2012

(30) Foreign Application Priority Data
Mar. 25, 2011  (JP) ................. 2011-067990

(51) Int. Cl.
| | |
|---|---|
| B29C 65/00 | (2006.01) |
| B64C 1/06 | (2006.01) |
| B29C 70/32 | (2006.01) |
| B29B 11/16 | (2006.01) |
| B29C 53/58 | (2006.01) |
| B64C 1/00 | (2006.01) |

(52) U.S. Cl.
CPC ............ B64C 1/061 (2013.01); B29B 11/16 (2013.01); B29C 53/588 (2013.01); B29C 70/32 (2013.01); B64C 2001/0072 (2013.01); Y02T 50/433 (2013.01); Y10T 428/13 (2015.01); Y10T 428/1369 (2015.01)

(58) Field of Classification Search
CPC ............ B29C 70/24; B29C 70/342; Y10T 156/10002; B29L 2031/003; B29L 2031/709; B29L 2031/7096; B29L 2031/3082
USPC ........ 156/285, 196, 227, 221, 180; 428/121, 428/113, 107, 35.7
See application file for complete search history.

(56) References Cited

U.S. PATENT DOCUMENTS

| | | | |
|---|---|---|---|
| 2006/0048890 A1* | 3/2006 | Sato et al. | ............. 156/285 |
| 2009/0026315 A1 | 1/2009 | Edelmann et al. | |
| 2010/0252182 A1 | 10/2010 | Rettig | |

FOREIGN PATENT DOCUMENTS

| | | |
|---|---|---|
| DE | 10 2007 049 347 | 4/2009 |
| EP | 0 172 098 | 2/1986 |
| JP | 50-151273 | 12/1975 |
| JP | 54-159476 | 12/1979 |
| JP | 61-47242 | 3/1986 |
| JP | 2-132068 | 5/1990 |
| JP | 9-314687 | 12/1997 |
| JP | 2005-153680 | 6/2005 |
| JP | 2006-56022 | 3/2006 |
| JP | 2006-69166 | 3/2006 |
| JP | 2008-543670 | 12/2008 |
| JP | 2011-37001 | 2/2011 |

OTHER PUBLICATIONS

Japanese Office Action issued Mar. 14, 2014 in corresponding Japanese Patent Application No. 2011-067990 with partial English translation.
European Search Report issued Feb. 12, 2014 in corresponding European Patent Application No. 12401045.5.

* cited by examiner

*Primary Examiner* — Ellen S Wood
(74) *Attorney, Agent, or Firm* — Wenderoth, Lind & Ponack, L.L.P.

(57) ABSTRACT

A first reinforcing fiber layer is formed of reinforcing fibers which are wound around an outer periphery of a mandrel. The reinforcing fibers are aligned in parallel to a direction (+θ direction) in which the reinforcing fibers intersect with an annular direction (0° direction) of the mandrel, and seamlessly continue in the annular direction of the mandrel by an amount of at least one rotation.

7 Claims, 8 Drawing Sheets

DRY PREFORM, ANNULAR STRUCTURE MADE OF A COMPOSITE MATERIAL, AND MANUFACTURING METHOD FOR THE ANNULAR STRUCTURE

TECHNICAL FIELD

The present invention relates to a hollow annular dry preform arranged on an outer periphery of an annular mandrel, an annular structure made of a composite material using the dry preform, and a manufacturing method for the annular structure.

BACKGROUND ART

For example, an annular structure such as a ring frame for airplanes is required to be excellent in strength and lightweight, and hence, in some cases, made of a composite material formed of reinforcing fibers impregnated with a resin. However, the ring frame normally has a modified cross-sectional shape comprising bent portions, such as a C-shape or a T-shape, and it is difficult to form the ring frame having such a modified cross-sectional shape with the composite material.

For example, Patent Literature 1 discloses a method of forming an annular structure having an L-shape in cross-section with use of a dry preform made of braiding. Specifically, first, as illustrated in FIG. 14, there is formed a long plate-shaped dry preform 105 having a tri-axial fabric structure formed of fibers (central strands) 105b orientated in a longitudinal direction and fibers (braiding strands) 105a orientated at braiding angles of ±α with respect to the longitudinal direction. Then, as illustrated in FIG. 15, the long plate-shaped dry preform 105 is formed into an L-shape in cross-section formed of a flat plate portion 121 and a perpendicular portion 122 by being bent along a short-side intermediate portion. Then, the perpendicular portion 122 is directed inward, and the dry preform 105 is deformed into a circular arc shape. Next, as illustrated in FIG. 16, a plurality of circular-arc dry preforms 105 are coupled to each other. In this way, an annular dry preform 102 having an L-shape in cross-section is formed.

However, in the dry preform made of the braiding as illustrated in FIG. 14, the braiding strands 105a are crimped in a wave-like form, and hence strength in directions of the fibers is smaller than that of liner reinforcing fibers. Further, in order to crimp the braiding strands 105a with the central strands 105b, it is necessary to array the central strands 105b while securing gaps. Thus, density of the central strands 105b decreases, which leads to a decrease in strength in the longitudinal direction. Further, a resin intrudes into the gaps between the central strands 105b, which leads to an increase in weight. In addition, the annular dry preform 102 is formed by coupling the plurality of circular-arc dry preforms 105 to each other, and hence reinforcing fibers are not continuous in an annular direction. As a result, strength in the annular direction decreases.

Meanwhile, Patent Literature 2 discloses an annular structure formed of a plurality of fiber layers in each of which reinforcing fibers are orientated in a predetermined direction. Specifically, as illustrated in FIG. 17, a sheet-like fabric laminate 209 is formed by laminating a fiber layer 210 in a first fiber direction (±45°), a fiber layer 211 in a second fiber direction (−45°), and an additional layer 212 in a third fiber direction (0°). The fabric laminate 209 is bent to form a blank having an L-shape in cross-section, and then the blank having an L-shape in cross-section is curved in an annular direction. In this way, the annular structure is formed. As described above, fibers are aligned in a certain direction in each of the fiber layers, and hence the fibers are linear. As a result, strength in directions of the fibers is higher than that of braiding in which fibers are crimped. Further, it is unnecessary to crimp the fibers, and hence fibers can be laid without securing gaps, with the result that density is enhanced. Thus, strength of the annular structure further increases. In addition, an amount of resin to intrude between the fibers is reduced, which leads to weight reduction of the annular structure.

CITATION LIST

Patent Literature 1: JP 2006-69166 A
Patent Literature 2: JP 2008-543670 A

SUMMARY OF INVENTION

Technical Problems

However, the annular structure formed by the method disclosed in Patent Literature 2 has a low degree of freedom in design. Specifically, the flat plate portion (base part) cannot be curved in an annular direction within a single plane when fibers are arranged in a third fiber direction (annular direction). Thus, it is necessary to form the flat plate portion only with fiber layers in the first fiber direction and the second fiber direction (±45°), which may lead to a risk that strength in the annular direction in the flat plate portion is insufficient. Further, the sheet-like fabric laminate 209 formed by laminating the fiber layers each formed of aligned fibers (refer to FIG. 17) has a lower degree of freedom in orientation of the fibers than that of the dry preform 105 (refer to FIG. 14) formed of braiding. Thus, it is difficult to deform the sheet-like fabric laminate 209 into a desired shape. In particular, when a part of the annular structure is different in cross-sectional shape in the annular direction, it is significantly difficult to deform the sheet-like fabric laminate 209 into such a desired shape. Further, when the annular structure has a large diameter (for example, diameter of 5 m or larger) for use, for example, as a ring frame for airplane bodies, it is difficult to perform an operation of forming the annular structure by curving the sheet-like fabric laminate 209 as described above. The operation is facilitated when, for example, the annular structure is formed by coupling a plurality of circular-arc segments to each other. However, in this case, strength decreases in the annular direction as in the above-mentioned case.

It is an object of the present invention to provide a hollow annular dry preform which is excellent in strength, lightweight, easily formed, and designed with a higher degree of freedom, an annular structure made of a composite material using the dry preform, and a manufacturing method for the annular structure.

Solution to Problems

In order to achieve the above-mentioned object, the present invention provides a dry preform having a hollow annular shape and formed of a plurality of reinforcing fiber layers laminated on an outer periphery of an annular mandrel, the annular mandrel being separated from the dry preform afterward, the dry preform comprising a first reinforcing fiber layer formed of reinforcing fibers which are wound spirally around the outer periphery of the annular mandrel, seamlessly continue in an annular direction by an amount of at least one rotation, and are aligned in a direction in which the reinforcing fibers intersect with the annular direction.

The dry preform has the following advantages. (1) The dry preform comprises the plurality of reinforcing fiber layers each formed of the reinforcing fibers aligned in parallel to each other, and hence strength is higher and weight is smaller than those of braiding in which reinforcing fibers are crimped. (2) The annular dry preform can be formed merely by winding the reinforcing fibers spirally around the annular mandrel. Thus, unlike the method disclosed in Patent Literature 2 above, it is no longer necessary to perform an operation of bending the sheet-like fabric laminate, and hence the dry preform can be formed more easily. (3) The reinforcing fibers are made continuous in the annular direction by the amount of at least one rotation while being wound around the outer periphery of the annular mandrel. In this way, the dry preform can be formed continuously in the annular direction. Thus, strength is higher than that in the case where a plurality of circular-arc dry preforms are coupled to each other. (4) The reinforcing fibers are wound in conformity with an outer peripheral shape of the annular mandrel. Thus, even when the cross-sectional shape of the annular structure is different in parts in the annular direction, the dry preform can be shaped in conformity with the annular mandrel.

The above-mentioned dry preform can be provided with reinforcing fiber layers in arbitrary directions other than that of the first reinforcing fiber layer, and hence can be designed with a higher degree of freedom. For example, it is possible to provide a second reinforcing fiber layer formed of reinforcing fibers which are wound spirally around the outer periphery of the annular mandrel, continue in the annular direction by the amount of at least one rotation, and are aligned in a direction symmetrical to the direction of the reinforcing fibers of the first reinforcing fiber layer with respect to the annular direction. It is also possible to provide a third reinforcing fiber layer formed of reinforcing fibers which continue in the annular direction by the amount of at least one rotation and are aligned in the annular direction.

With use of the above-mentioned dry preform, the annular structure made of the composite material can be easily obtained. Specifically, it is possible to obtain the annular structure made of the composite material comprising at least one of a plurality of divided dry preforms formed by dividing the above-mentioned hollow annular dry preform along the annular direction, and a resin impregnated into the at least one of the plurality of divided dry preforms. This annular structure can be used, for example, as a ring frame for airplanes.

The dry preform as described above can be manufactured by a method comprising: forming, by winding reinforcing fibers spirally around an outer periphery of an annular mandrel, a dry preform comprising a first reinforcing fiber layer formed of reinforcing fibers, which seamlessly continue in an annular direction by an amount of at least one rotation, and are aligned in a direction in which the reinforcing fibers intersect with the annular direction; separating the dry preform from the annular mandrel by deviding the dry preform along the annular direction into a plurality of divided dry preforms; and impregnating a resin into the plurality of devided dry preforms.

Alternatively, the dry preform as described above can be manufactured by a method comprising: forming, by winding reinforcing fibers spirally around an outer periphery of an annular mandrel, a dry preform comprising a first reinforcing fiber layer formed of reinforcing fibers, which seamlessly continue in an annular direction by an amount of at least one rotation, and are aligned in a direction in which the reinforcing fibers intersect with the annular direction; impregnating a resin into the dry preform so that a composite material is formed; and separating the composite material from the annular mandrel by deviding the composite material along the annular direction into a plurality of divided composite materials. In this case, the forming of the dry preform and the impregnating of the resin can be simultaneously performed by feeding reinforcing fibers to the outer periphery of the annular mandrel after a resin is applied to surfaces of the reinforcing fibers.

When the first reinforcing fiber layer is formed by wounding a reinforcing fiber bundle, which is formed of a plurality of reinforcing fibers aligned in parallel to each other, around the outer periphery of the annular mandrel, the reinforcing fiber can be wound efficiently.

Further, when the dry preform comprises a third reinforcing fiber layer formed of reinforcing fibers which continue in the annular direction by the amount of at least one rotation and are aligned in the annular direction, the third reinforcing fiber layer can be easily fixed to the outer periphery of the annular mandrel by feeding the reinforcing fibers aligned in the annular direction to the outer periphery of the mandrel and winding the reinforcing fibers of the first reinforcing fiber layer spirally around an outer periphery of the reinforcing fibers of the third reinforcing fiber layer.

Advantageous Effects of Invention

As described above, according to the present invention, it is possible to obtain the annular dry preform which is excellent in strength, lightweight, easily formed, and designed with a higher degree of freedom, an annular structure made of a composite material using the dry preform, and a manufacturing method for the annular structure.

DESCRIPTION OF EMBODIMENTS

In the following, description is made of embodiments of the present invention with reference to the drawings.

Figure 1:
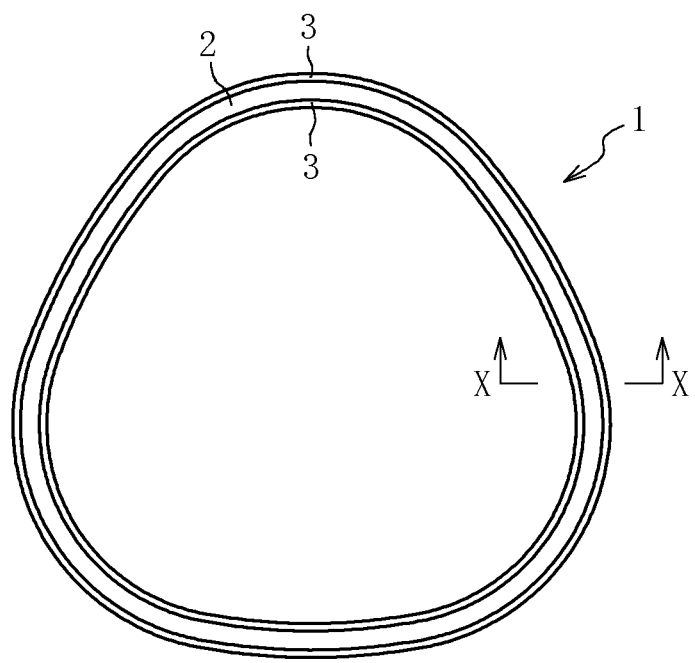
FIG. 1 A front view of an annular structure according to an embodiment of the present invention.
Figure 2:
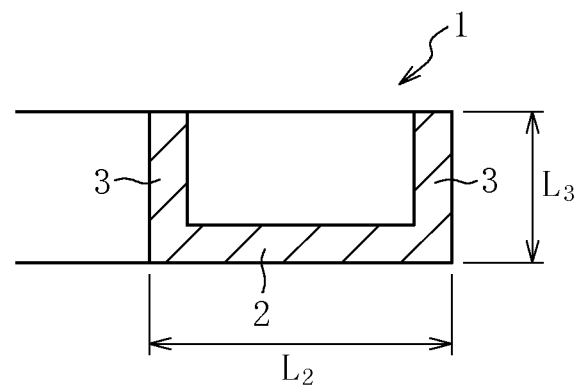
FIG. 2 A sectional view taken along the line X-X of FIG. 1.

FIG. 1 illustrates an annular structure 1 according to an embodiment of the present invention. The annular structure 1 is used as a ring frame for airplane bodies, and has a diameter of from approximately 3 m to 10 m. As illustrated in FIG. 2, the annular structure 1 has a C-shape in cross section. Specifically, the annular structure 1 is formed of a substantially flat plate-shaped web 2 and cylindrical flanges 3 provided substantially upright from a radially inner end and a radially outer end of the web 2. The cross-sectional shape of the annular structure 1 is somewhat different in parts in an annular direction. Specifically, although not shown in detail, at parts required to have especially high strength, a short-side dimension $L_2$ of the web 2 and a short-side dimension $L_3$ of the flanges 3 are set to be somewhat larger for the purpose of enhancement of strength. Meanwhile, at parts required to have relatively low strength, the short-side dimension $L_2$ of the web 2 and the short-side dimension $L_3$ of the flanges 3 are set to be somewhat smaller for the purpose of weight reduction.

The annular structure 1 is made of a composite material obtained by impregnating a dry preform formed of a plurality of laminated reinforcing fiber layers with a resin. Examples of the reinforcing fiber comprise carbon fiber and glass fiber. Examples of the resin comprise a thermosetting resin and a thermoplastic resin. Specifically, the thermosetting resin comprises an epoxy resin, a bismaleimide resin, and a polyimide resin, and the thermoplastic resin comprises a polyether ether ketone resin.

Figure 3:
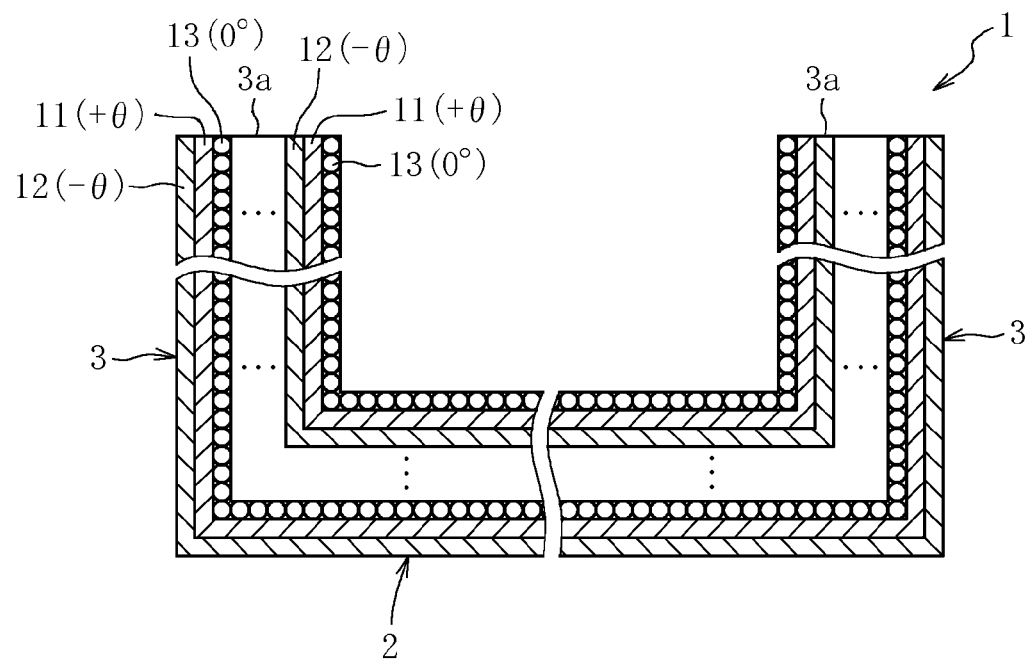
FIG. 3 A sectional view illustrating a lamination state of reinforcing fiber layers of the annular structure.

As illustrated in FIG. 3, the annular structure 1 comprises a plurality of reinforcing fiber layers each formed of reinforcing fibers aligned in a predetermined direction. In the illustration, there are laminated a first reinforcing fiber layer 11 formed of reinforcing fibers orientated in a direction in which the reinforcing fibers intersect with the annular direction at a predetermined angle (hereinafter, referred to as +θ direction), a second reinforcing fiber layer 12 formed of reinforcing fibers orientated in a direction symmetrical to that of the reinforcing fibers of the first reinforcing fiber layer 11 with respect to the annular direction (hereinafter, referred to as −θ direction), and a third reinforcing fiber layer 13 formed of reinforcing fibers orientated in the annular direction (hereinafter, referred to as 0° direction). The first reinforcing fiber layer 11, the second reinforcing fiber layer 12, and the third reinforcing fiber layer 13 are laminated in a manner that the respective fiber orientation directions each intersect with that of adjacent one layer. In this embodiment, the third reinforcing fiber layer 13 (0°), the first reinforcing fiber layer 11 (+θ), and the second reinforcing fiber layer 12 (−θ) are repeatedly laminated in this order, the number of each of the three layers being, for example, five to ten. Each of the orientation angles θ of the first reinforcing fiber layer 11 and the second reinforcing fiber layer 12 is set within a range of 20° to 70°, for example, set to 60°. The first reinforcing fiber layer 11, the second reinforcing fiber layer 12, and the third reinforcing fiber layer 13 are continuously provided along the web 2 and the pair of flanges 3. In particular, in each of the first reinforcing fiber layer 11 and the second reinforcing fiber layer 12, reinforcing fibers seamlessly continue from an end surface 3a of one of the flanges 3 to an end surface 3a of another of the flanges 3 and are orientated at a certain angle.

The above-mentioned annular structure 1 is manufactured through a dry preform forming step, a separation step, and a resin impregnating step. In the following, those steps are sequentially described.

Figure 4:
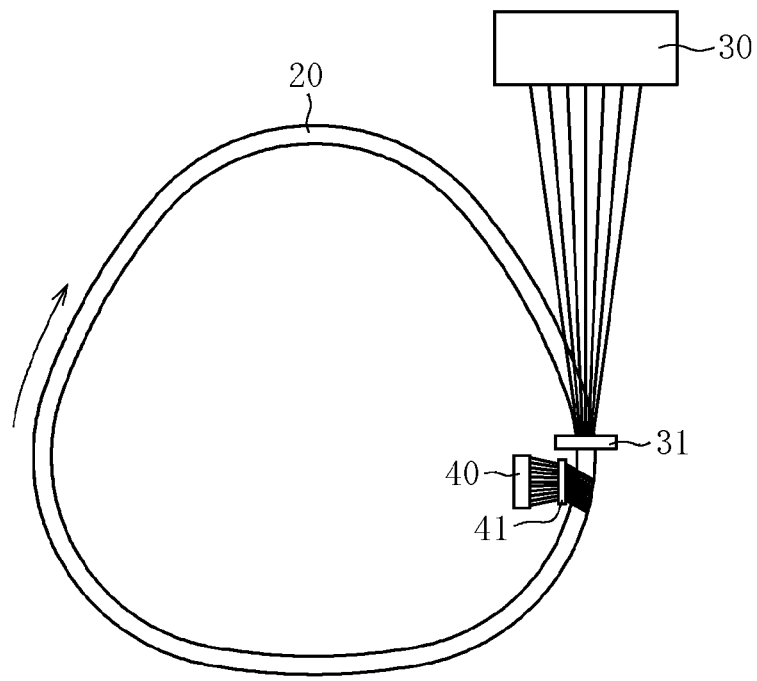
FIG. 4 A front view illustrating a dry preform forming step in a manufacturing method for the annular structure, illustrating how a first reinforcing fiber layer and a third reinforcing fiber layer are fed.

The dry preform forming step refers to a step of forming a hollow annular dry preform by feeding reinforcing fibers to an outer periphery of an annular mandrel 20 as illustrated in FIG. 4. The mandrel 20 has, for example, a rectangular shape in cross-section (square shape in this embodiment), and has an annular shape similar to that of the annular structure 1 illustrated in FIG. 1. In the illustration, the mandrel 20 is formed into a hollow shape for the purpose of weight reduction. As described above, the cross-sectional shape of the annular structure 1 is somewhat different in parts in the annular direction. Thus, in conformity therewith, the cross-sectional shape of the mandrel 20 is also somewhat different in parts in the annular direction.

A feeding apparatus for feeding reinforcing fibers to an outer peripheral surface of the mandrel 20 comprises a rotation drive portion (not shown) for rotating the mandrel 20 to one side in the annular direction (clockwise direction in FIG. 4, refer to the arrow), an annular fiber-feeding portion 30 for feeding reinforcing fibers to the outer peripheral surface of the mandrel 20 along the annular direction, and a fiber winding portion 40 for winding the reinforcing fibers around the outer peripheral surface of the mandrel 20.

A plurality of reinforcing fibers fed from the annular fiber-feeding portion 30 are arranged through intermediation of a guide 31 onto the outer peripheral surface of the mandrel 20. The guide 31 is provided with a plurality of guide holes (not shown) for guiding the reinforcing fibers. Through guiding of the reinforcing fibers with the guide holes, the reinforcing fibers are arranged onto the outer peripheral surface of the mandrel 20 under a state in which the reinforcing fibers are aligned in the annular direction. In this embodiment, annular reinforcing fibers are arranged with a uniform density over the entire outer peripheral surface of the mandrel 20 having a rectangular shape in cross-section. In this way, the third reinforcing fiber layer 13 obtained by orientating the reinforcing fibers in the annular direction (0°) is fed on the outer peripheral surface of the mandrel 20.

Figure 5:
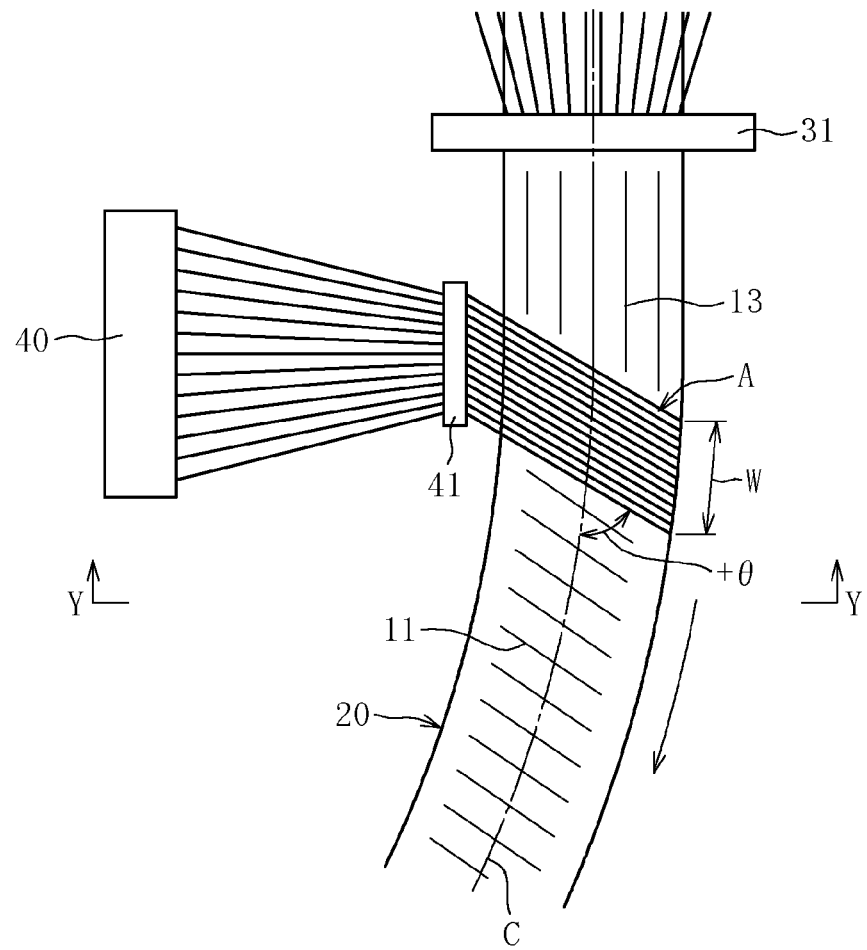
FIG. 5 An enlarged view of FIG. 4.
Figure 6:
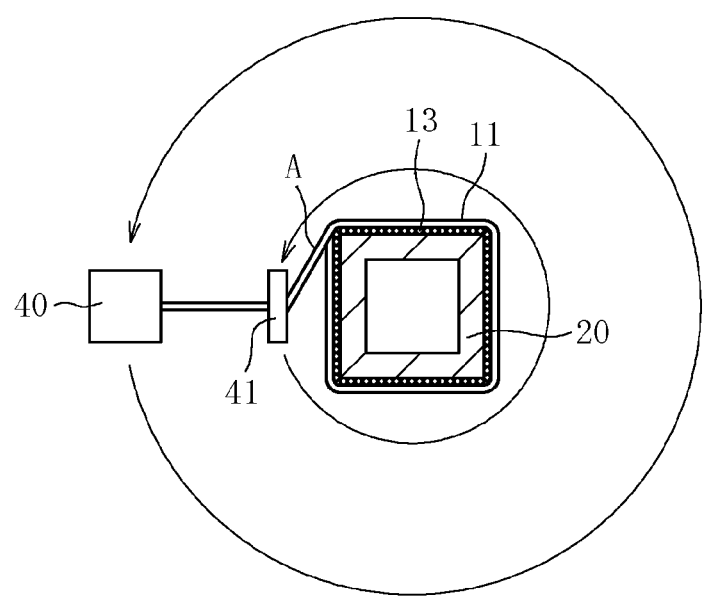
FIG. 6 A sectional view taken along the line Y-Y of FIG. 5.

Simultaneously, a plurality of reinforcing fibers fed from the fiber winding portion 40 are wound around the outer peripheral surface of the mandrel 20 through intermediation of another guide 41 as illustrated in FIG. 5. The guide 41 is provided with a plurality of guide holes (not shown) for guiding the reinforcing fibers. In this embodiment, the guide holes are arrayed in the annular direction, and hence the plurality of reinforcing fibers guided by the guide holes are arrayed in the annular direction. In this way, a sheet-like fiber bundle A is formed. Then, as illustrated in FIG. 6, both the fiber winding portion 40 and the guide 41 are revolved around the mandrel 20 so that the sheet-like fiber bundle A is wound around the outer periphery of the mandrel 20 (refer to FIG. 5). In this case, when the fiber winding portion 40 and the guide 41 are revolved while the mandrel 20 is rotated to the one side in the annular direction (refer to the arrow), there is fed a sheet-like fiber bundle A formed of the reinforcing fibers aligned parallel to each other at a predetermined angle (+θ) with respect to an annular direction C. Further, when the mandrel 20 is rotated to the one side in the annular direction by an amount of a width W of the sheet-like fiber bundle A during one revolution of the fiber winding portion 40 and the guide 41 around the mandrel 20, the fiber bundles A are laid around the outer periphery of the mandrel 20 without gaps. Note that, although the cross-sectional shape of the mandrel 20 is different in parts in the annular direction, when the sheet-like fiber bundle A is wound around the mandrel 20, each of the reinforcing fibers of the sheet-like fiber bundle A conforms to an outer peripheral shape of the mandrel 20. Thus, the fiber bundle A as a whole can easily conform to the outer peripheral shape of the mandrel 20. In this way, the first reinforcing fiber layer 11 obtained by aligning the reinforcing fibers in a direction (+θ) in which the reinforcing fibers intersect with the annular direction C is fed to the outer periphery of the mandrel 20. Through winding of the fiber bundle A around an outer periphery of the third reinforcing fiber layer 13 fed from the annular fiber-feeding portion 30 through intermediation of the guide 31 onto the outer peripheral surface of the mandrel 20 as described above, the third reinforcing fiber layer 13 is fixed to the outer periphery of the mandrel 20.

Figure 7:
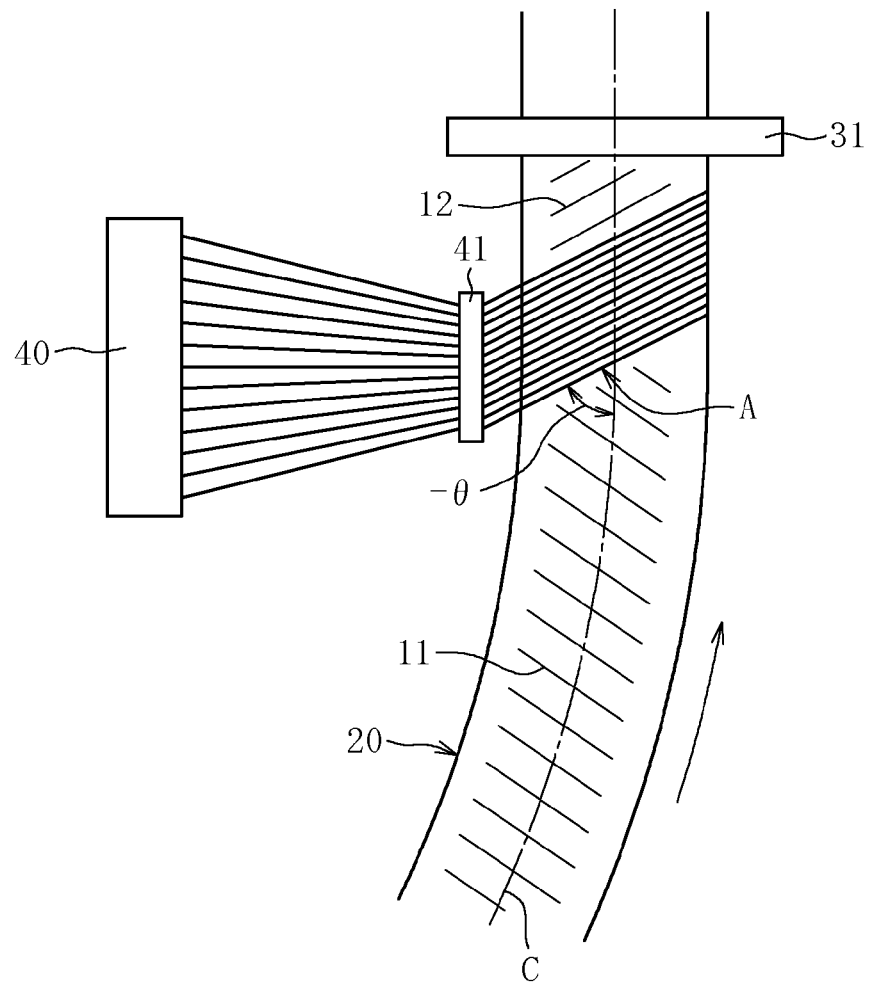
FIG. 7 Another front view illustrating the dry preform forming step in the manufacturing method for the annular structure, illustrating how a second reinforcing fiber layer is fed.

After the reinforcing fibers of the first reinforcing fiber layer are wound by an amount of one rotation of the mandrel 20 in the annular direction in accordance with the one rotation of the mandrel 20 in the annular direction, which is made by the rotation drive portion, the rotation drive portion, the fiber winding portion 40, and the guide 41 are stopped, and the reinforcing fibers fed from the fiber winding portion 40 and the reinforcing fibers in the annular direction are cut once. Then, as illustrated in FIG. 7, the mandrel 20 is rotated by the rotation drive portion toward another side in the annular direction (counterclockwise direction in FIG. 7, refer to the arrow) at the same speed as that in the above-mentioned case. Simultaneously, the fiber winding portion 40 and the guide 41 are revolved in the same direction at the same speed as those in the above-mentioned case. In this way, the sheet-like fiber bundle A formed of reinforcing fibers aligned at a predetermined angle (−θ) with respect to the annular direction C is wound around the outer peripheral surface of the mandrel 20, with the result that the second reinforcing fiber layer 12 is laminated around an outer periphery of the first reinforcing fiber layer 11. Through repetition of the above-mentioned steps, the third reinforcing fiber layer 13, the first reinforcing fiber layer 11, and the second reinforcing fiber layer 12 are sequentially laminated (refer to FIG. 3). In this way, a hollow annular dry preform 50 is formed around the outer periphery of the mandrel 20 (refer to FIG. 8). Note that, a forming method for the second reinforcing fiber layer 12 is not limited to that described above. For example, the second reinforcing fiber layer 12 may be formed by revolving the fiber winding portion 40 and the guide 41 into a direction reverse to the direction of the arrow in FIG. 6 (clockwise direction) while the mandrel 20 is rotated with the rotation drive portion toward the one side in the annular direction (in the same direction as that illustrated in FIG. 5).

The dry preform 50 is temporarily fixed with binder or the like. Specifically, after the dry preform 50 is formed by mixing thermal adhesive binder fibers into the reinforcing fibers fed from the annular fiber-feeding portion 30 or the reinforcing fibers fed from the fiber winding portion 40, the dry preform 50 thus formed is heated so that the binder fibers are molten. When the binder fibers are solidified, the dry preform 50 can be temporarily fixed. Alternatively, temporal fixation may be performed by supplying adhesive powder-form or mist-form binder to a surface of the dry preform 50 after the dry preform 50 is formed. Note that, when necessary, end portions of the reinforcing fibers may be temporarily fixed to a surface of the mandrel 20 or a surface of the reinforcing fiber layer with binder or the like.

Figure 9:
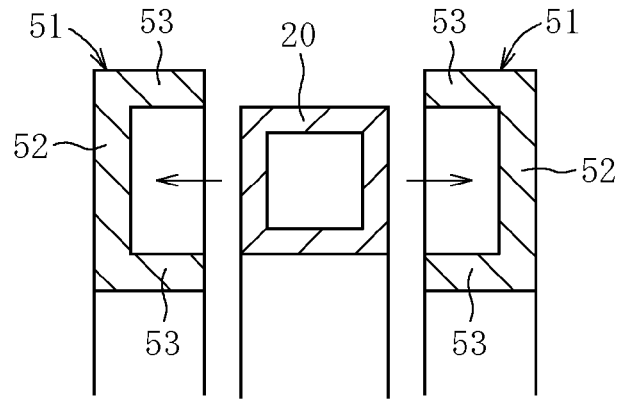
FIG. 9 A sectional view of a separation step in the manufacturing method for the annular structure.

As illustrated in FIG. 9, the hollow annular dry preform 50 thus obtained is divided into a plurality of pieces (two in illustration) along the annular direction, and the mandrel 20 is taken out from the inside (separation step). With this, there are obtained a pair of divided dry preforms 51 each having the same shape as that of the annular structure 1 illustrated in FIG. 1, that is, a C-shape in cross-section formed of a web 52 and flanges 53. In this case, it is preferred to arrange end portions of the reinforcing fibers of the first reinforcing fiber layer 11 and the second reinforcing fiber layer 12 on divided surfaces of the hollow annular dry preform 50 because seams of the reinforcing fibers are not formed at all in the first reinforcing fiber layer 11 and the second reinforcing fiber layer 12 of the web 52 or the flanges 53 of each of the divided dry preforms 51.

In the resin impregnating step, the divided dry preform 51 separated from the mandrel 20 is impregnated with a resin, and the resin is solidified. In this way, a composite material is formed. A method of impregnating and solidifying the resin is not particularly limited. For example, the resin can be impregnated and solidified by a resin transfer molding (RTM) method. In this way, the annular structure 1 made of the composite material is completed (refer to FIG. 1).

The present invention is not limited to the above-mentioned embodiment. Hereinafter, other embodiments of the present invention are described. Portions having the same functions as those of the above-mentioned embodiment are denoted by the same reference symbols, and redundant description is omitted.

Figure 8:
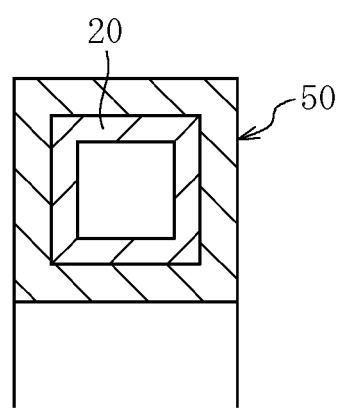
FIG. 8 A sectional view of a hollow annular dry preform and a hollow annular mandrel.

In the above-mentioned embodiment, the resin impregnating step is performed after the separation step, but reversely, after a hollow annular composite material is formed by impregnating a resin into the hollow annular dry preform 50 illustrated in FIG. 8, the composite material thus formed may be divided along the annular direction so that mandrel 20 is taken out from the inside. In this case, the resin impregnating step and the dry preform forming step can be simultaneously performed. For example, a resin is applied in advance by dipping or the like to the surfaces of reinforcing fibers fed from the annular fiber-feeding portion 30, and the reinforcing fibers is aligned in the annular direction and fed to the outer periphery of the mandrel 20. By feeding the reinforcing fibers in the annular direction to the outer periphery of the mandrel 20, the resin adhering to the reinforcing fibers is impregnated into the dry preform 50. And, the annular structure 1 made of the composite material can be obtained by performing heating after that.

Figure 10:
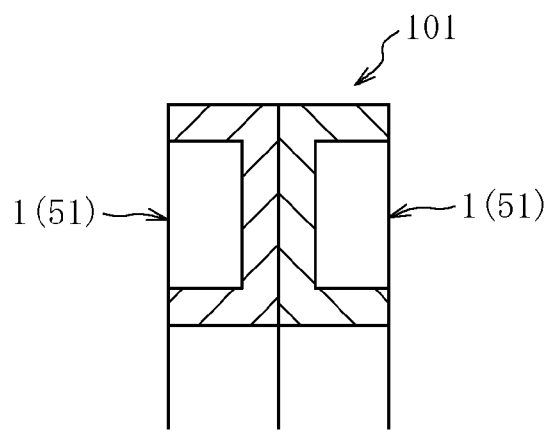
FIG. 10 A sectional view of an annular structure according to another embodiment of the present invention.

Further, in the above-mentioned embodiment, the annular structure 1 has a C-shape in cross-section, but the present invention is not limited thereto. For example, an annular structure 101 having an H-shape in cross-section as illustrated in FIG. 10 may be formed. In this case, the annular structure 1 is formed by impregnating a resin into the pair of divided dry preforms 51 each having a C-shape in cross-section, and then the pair of divided dry preforms 51 are fixed back-to-back to each other. In this way, the annular structure 101 having an H-shape in cross-section is obtained. Alternatively, the annular structure 101 having an H-shape in cross-section is obtained by impregnating a resin under a state in which the pair of divided dry preforms 51 each having a C-shape in cross-section are arranged back-to-back to each other.

Figure 11:
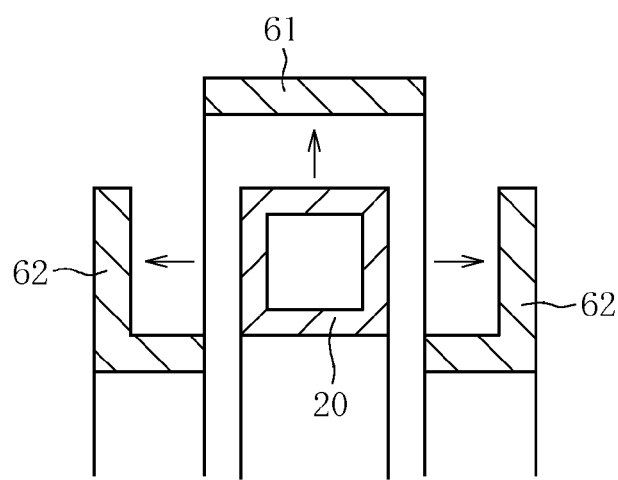
FIG. 11 A sectional view illustrating a separation step in a manufacturing method according to still another embodiment of the present invention.
Figure 12:
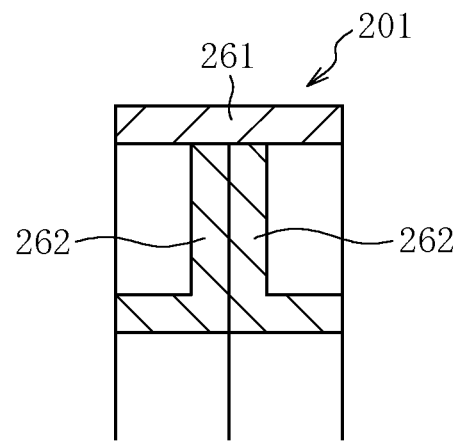
FIG. 12 A sectional view of an annular structure according to the still another embodiment.

Still further, in the above-mentioned embodiment, the hollow annular dry preform 50 is divided into two in the separation step, but the present invention is not limited thereto. For example, as illustrated in FIG. 11, the dry preform 50 may be divided into three. In the illustration, the dry preform 50 is divided into a cylindrical divided dry preform 61 and a pair of divided dry preforms 62 each having an L-shape in cross-section. Annular structures 261 and 262 are obtained by impregnating a resin into those divided dry preforms 61 and 62. Those annular structures 261 and 262 may be used independently of each other, or may form an annular structure 201 having an H-shape in cross-section by being combined and integrated with each other as illustrated in FIG. 12.

Figure 13:
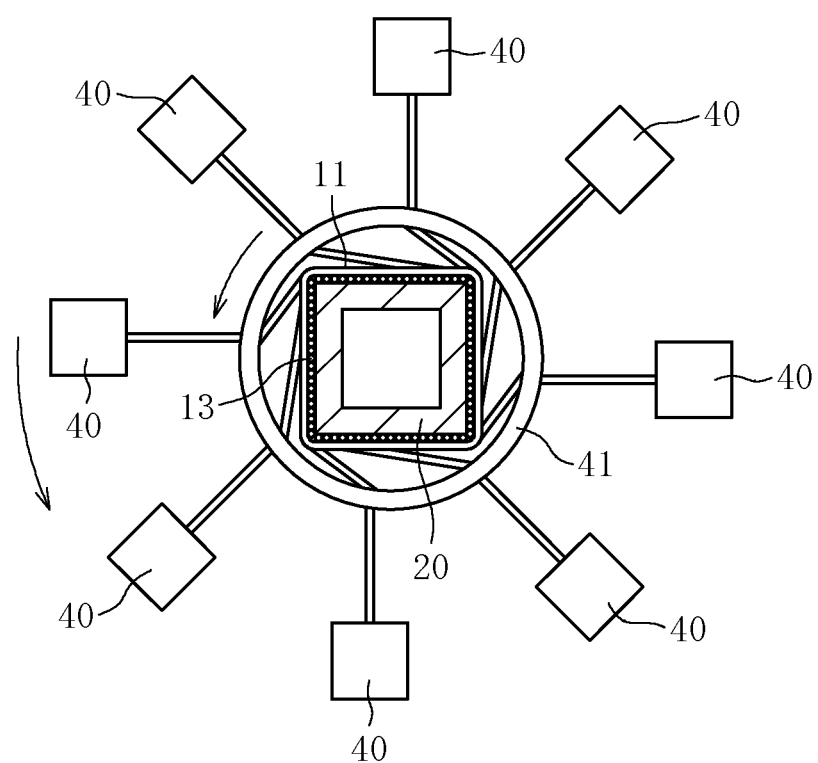
FIG. 13 A front view illustrating a dry preform forming step in a manufacturing method according to yet another embodiment of the present invention, illustrating how reinforcing fibers of the first reinforcing fiber layer are wound.
Figure 14:
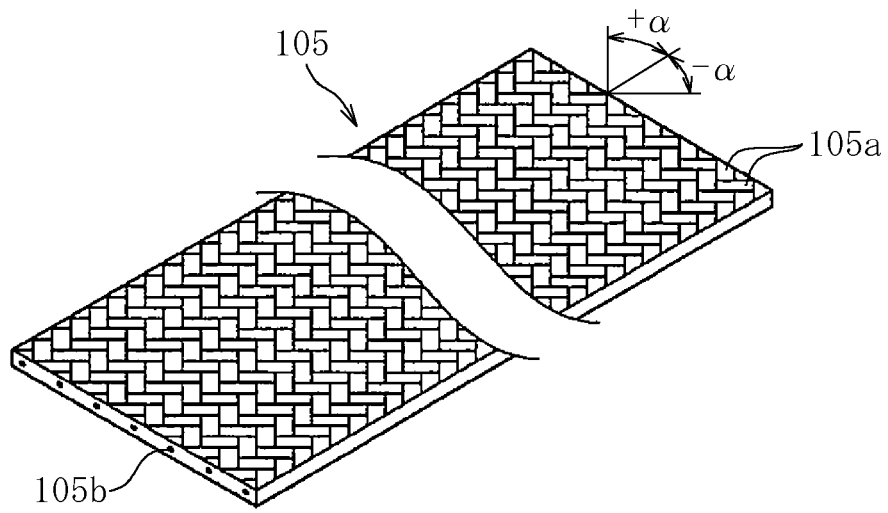
FIG. 14 A perspective view of a long plate-shaped dry preform made of braiding (corresponding to FIG. 4 of Patent Literature 1).
Figure 15:
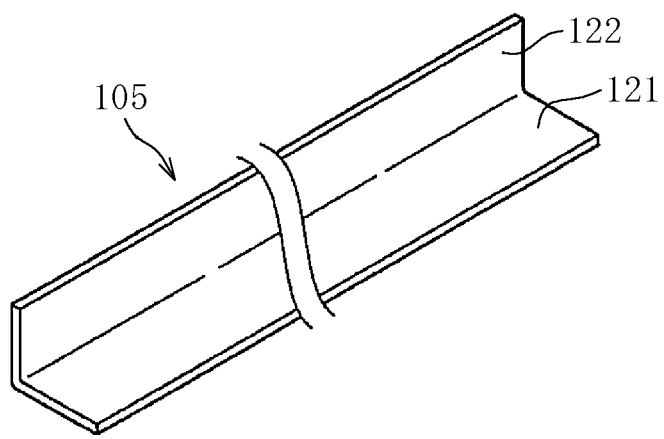
FIG. 15 A perspective view illustrating a state in which the long plate-shaped dry preform of FIG. 14 is bent along a short-side intermediate portion (corresponding to FIG. 5 of Patent Literature 1).
Figure 16:
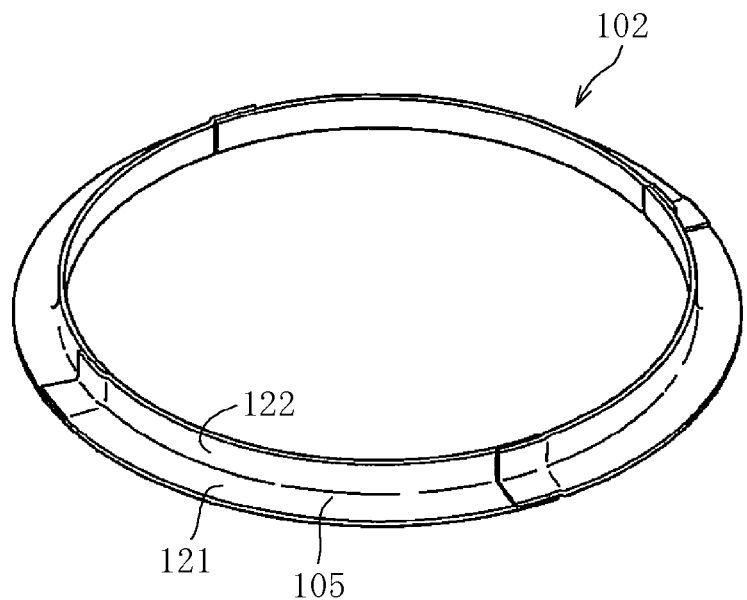
FIG. 16 A perspective view of an annular dry preform formed by coupling the dry preforms of FIG. 15 (corresponding to FIG. 6 of Patent Literature 1).
Figure 17:
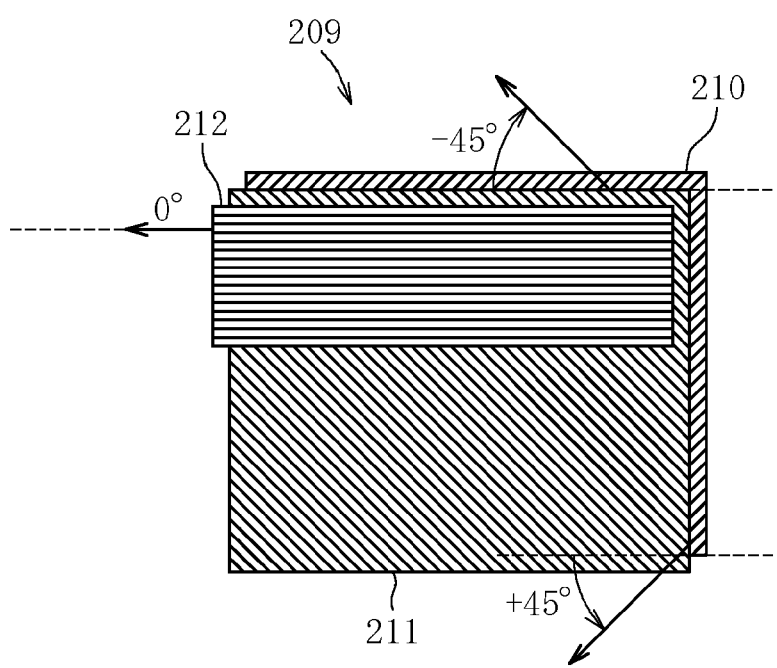
FIG. 17 A plan view of a sheet-like fabric laminate (corresponding to FIG. 3 of Patent Literature 2).

Yet further, in the above-mentioned embodiment, the fiber winding portion 40 feeds the sheet-like fiber bundle A formed of reinforcing fibers aligned in the annular direction, but the present invention is not limited thereto. For example, as illustrated in FIG. 13, the fiber winding portion 40 may comprise a plurality of (eight in the illustration) fiber winding portions 40 arranged at equal intervals along the outer periphery of the mandrel 20. The guide 41 is annularly provided so as to surround the outer periphery of the mandrel 20, and provided with guide holes at equal intervals. By revolving the plurality of fiber winding portions 40 and the guide 41 together in directions indicated by the arrows, reinforcing fibers are wound around the outer periphery of the mandrel 20. In this case, the annular reinforcing fibers fed to the outer periphery of the mandrel 20 (third reinforcing fiber layer 13) can be substantially simultaneously pressed with reinforcing fibers fed from the plurality of fiber winding portions 40 over the entire periphery.

Yet further, in the above-mentioned embodiment, the mandrel 20 has a rectangular shape in cross-section, but the present invention is not limited thereto. For example, the mandrel 20 may have a trapezoidal shape in cross-section or a circular shape in cross-section.

Yet further, in the above-mentioned embodiment, there are provided the first reinforcing fiber layer 11 and the second reinforcing fiber layer 12 orientated in respective inclined directions (+θ direction and −θ direction) with respect to the annular direction, and the third reinforcing fiber layer 13 orientated in the annular direction (0° direction). However, the present invention is not limited thereto, and a combination of those layers may be appropriately changed in accordance with strength and a direction in which the strength is required. For example, one of or both the second reinforcing fiber layer 12 and the third reinforcing fiber layer 13 may be omitted. Alternatively, another reinforcing fiber layer inclined in another direction may be added to the first reinforcing fiber layer 11, the second reinforcing fiber layer 12, and the third reinforcing fiber layer 13.

Yet further, in the above-mentioned embodiment, the annular structure 1 is used as a ring frame for airplane bodies, but the present invention is not limited thereto. For example, the annular structure 1 may be used as a rim for bicycles and automobiles.

REFERENCE SIGNS LIST

1 annular structure
2 web
3 flange
11 first reinforcing fiber layer
12 second reinforcing fiber layer
13 third reinforcing fiber layer
20 mandrel
30 annular fiber-feeding portion
31 guide
40 fiber winding portion
41 guide
50 dry preform
A sheet-like fiber bundle

The invention claimed is:

1. A composite annular structure comprising:
   at least one divided dry preform that is a divided part of a dry preform along an annular direction; and
   a resin impregnated into the at least one divided dry preform,
   wherein the at least one divided dry preform comprises:
      a first reinforcing fiber layer formed of reinforcing fibers aligned in parallel to each other in a first direction with respect to the annular direction in which the reinforcing fibers intersect with the annular direction,
      a second reinforcing fiber layer formed of reinforcing fibers aligned in parallel to each other in a second direction with respect to the annular direction in which the reinforcing fibers intersect with the annular direction, and
      a third reinforcing fiber layer formed of reinforcing fibers that continue in the annular direction for at least one rotation around the at least one divided dry preform and are parallel to the annular direction,
   wherein a first line extending in the first direction and a second line extending in the second direction that both pass through a point on a line extending along the annular direction are symmetrical to each other with respect to a plane that is orthogonal to the line extending along the annular direction and that passes through the point on the line extending along the annular direction,
   wherein the first reinforcing fiber layer, the second reinforcing fiber layer, and the third reinforcing fiber layer are laminated, and
   wherein the reinforcing fibers of the first reinforcing fiber layer, the second reinforcing fiber layer, and the third reinforcing fiber layer are free of crimps.

2. A ring frame for an airplane, the ring frame comprising a composite annular structure according to claim 1.

3. A composite annular structure according to claim 1, wherein the first direction and the second direction are different.

4. A ring frame for an airplane, the ring frame comprising a composite annular structure according to claim 3.

5. An annular preform for a composite structure, the annular preform comprising:
   a first reinforcing fiber layer formed of reinforcing fibers aligned in parallel to each other in a first direction with respect to an annular direction in which the reinforcing fibers intersect with the annular direction;

a second reinforcing fiber layer formed of reinforcing fibers aligned in parallel to each other in a second direction with respect to the annular direction in which the reinforcing fibers intersect with the annular direction; and a third reinforcing fiber layer formed of reinforcing fibers that continue in the annular direction for at least one rotation around the annular preform for the composite annular structure and are parallel to the annular direction, wherein a first line extending in the first direction and a second line extending in the second direction that both pass through a point on a line extending along the annular direction are symmetrical to each other with respect to a plane that is orthogonal to the line extending along the annular direction and that passes through the point on the line extending along the annular direction, wherein the first reinforcing fiber layer, the second reinforcing fiber layer, and the third reinforcing fiber layer are laminated, and wherein the reinforcing fibers of the first reinforcing fiber layer, the second reinforcing fiber layer, and the third reinforcing fiber layer are free of crimps.

6. The composite annular structure according to claim 1, wherein the first reinforcing fiber layer is located between the second reinforcing fiber layer and the third reinforcing fiber layer.

7. The annular preform according to claim 5, wherein the first reinforcing fiber layer is located between the second reinforcing fiber layer and the third reinforcing fiber layer.

\* \* \* \* \*